US012631228B2

(12) United States Patent
Bosis et al.

(10) Patent No.:  US 12,631,228 B2
(45) Date of Patent:  May 19, 2026

(54) PAD-HOLDING AND PAD RETURN SPRING ASSEMBLY, PAD ASSEMBLY, DISC BRAKE ASSEMBLY

(71) Applicant: BREMBO S.p.A., Curno (IT)

(72) Inventors: Alberto Bosis, Curno (IT); Cristian Crippa, Curno (IT); Davide D'Alessio, Curno (IT); Mauro Mambretti, Curno (IT); Andrea Mecocci, Curno (IT)

(73) Assignee: Brembo S.p.A., Curno (IT)

( * ) Notice: Subject to any disclaimer, the term of this patent is extended or adjusted under 35 U.S.C. 154(b) by 413 days.

(21) Appl. No.: 18/253,430

(22) PCT Filed: Nov. 11, 2021

(86) PCT No.: PCT/IB2021/060440
§ 371 (c)(1),
(2) Date: May 18, 2023

(87) PCT Pub. No.: WO2022/106965
PCT Pub. Date: May 27, 2022

(65) Prior Publication Data
US 2023/0417298 A1      Dec. 28, 2023

(30) Foreign Application Priority Data
Nov. 20, 2020    (IT) ........................ 102020000027948

(51) Int. Cl.
*F16D 65/097*          (2006.01)
*F16D 55/226*          (2006.01)
*F16D 55/00*            (2006.01)

(52) U.S. Cl.
CPC ....... *F16D 65/0972* (2013.01); *F16D 55/226* (2013.01); *F16D 65/0978* (2013.01); *F16D 2055/0029* (2013.01)

(58) Field of Classification Search
CPC ....... F16D 65/097–0979; F16D 55/226; F16D 55/0029
See application file for complete search history.

(56) References Cited

U.S. PATENT DOCUMENTS 5,249,647 A * 10/1993 Kobayashi ............ F16D 65/092
188/73.38
8,869,950 B2  10/2014 Maehara et al.
(Continued)

FOREIGN PATENT DOCUMENTS

CN          207989608 U     10/2018
DE      102015007523 A1     12/2016
(Continued)

OTHER PUBLICATIONS

European Patent Office, International Search Report, issued in PCT/IB2021/060440, Feb. 24, 2022, Rijswijk, NL.

*Primary Examiner* — David R Morris
(74) *Attorney, Agent, or Firm* — Marshall & Melhorn, LLC

(57)                ABSTRACT

A pad-holding and pad return spring assembly has a pad-holding spring arranged between a guiding ear of a brake pad and a support, and a pad return spring. The pad holding spring has a C-shaped section having a central portion adapted to be inserted into a recess of the support and to accommodate the guiding ear. The pad return spring has an anchoring portion connected to the C-shaped section extending in an axial direction in a first orientation opposite to a brake disc, and an elastic return arm connected to the anchoring portion and having an elastic return arm end for engaging the brake pad. The elastic return arm develops along an elastic return arm longitudinal direction oriented in the axial direction with a second orientation concordant with (Continued)

the brake disc, is elastically movable between an advanced position and a resting position.

20 Claims, 8 Drawing Sheets

(56) References Cited

U.S. PATENT DOCUMENTS

| | | | |
|---|---|---|---|
| 9,677,629 B2 | 6/2017 | Boyle et al. | |
| 2012/0090927 A1 | 4/2012 | Bach et al. | |
| 2013/0025981 A1 | 1/2013 | Maehara et al. | |
| 2016/0053837 A1* | 2/2016 | Lou ....................... | F16D 55/225 |
| | | | 188/73.38 |
| 2018/0223928 A1 | 8/2018 | Miller et al. | |
| 2018/0355932 A1* | 12/2018 | Mallmann ............... | B60T 1/065 |
| 2019/0085921 A1* | 3/2019 | Reuss ................. | F16D 55/2262 |
| 2024/0125366 A1* | 4/2024 | D'Alessio ........... | F16D 65/0978 |

FOREIGN PATENT DOCUMENTS

| | | | |
|---|---|---|---|
| EP | 1591689 A1 | 11/2005 | |
| GB | 2257483 A | 1/1993 | |

* cited by examiner

PAD-HOLDING AND PAD RETURN SPRING ASSEMBLY, PAD ASSEMBLY, DISC BRAKE ASSEMBLY

FIELD OF THE INVENTION

The present invention relates to a brake caliper spring assembly capable of biasing a brake pad in axial, circumferential, and radial directions to reduce vibration and move the pad away from the brake disc when braking is completed to eliminate or reduce residual torque between the friction material and the brake disc.

BACKGROUND ART

Disc brake spring assemblies configured to elastically hold and affect at least one brake pad in a brake caliper are known.

In particular, the documents US20180223928, U.S. Pat. Nos. 9,677,629, 8,869,950, and CN207989608U show spring assemblies having a pad-holding spring operatively connected to a pad return spring.

Usually, the pad-holding springs hold the pads inside their housings in the brake caliper without limiting their movement in the axial direction to reduce vibrations.

The pad return spring instead biases the pads away from the brake disc to reduce or eliminate a residual braking torque (residual torque) due to undesired contacts between the pads and the brake disc with the brake deactivated.

Some known solutions include spring assemblies in which the pad-holding spring is made in one piece with the pad return spring. Such springs are made from a single piece of shaped and bent sheet metal and thus for each different field of application of the disc brake it is necessary to make different types of springs. Such solutions are particularly disadvantageous in terms of production costs, as a specific spring assembly is required for each different disc brake application.

Other well-known solutions comprise spring assemblies in which the pad-holding spring and pad return spring are made starting from separate shaped and bent pieces of sheet metal, and are assembled afterward. In this manner, the pad return springs can be customized according to the application requirements of the braking system. However, the use of axial disc springs, particularly in high-performance brake applications, raises issues of space and weight gain that negatively affect the performance of the vehicle on which the brake is mounted.

Furthermore, it has been found that in some known solutions, at least a portion of the pad return spring slides on a respective portion of the pad-holding spring in the movements of approaching the brake pad to the disc and/or in the movements of moving the brake pad away from the disc. Such a sliding generates friction and consequently has a negative effect on braking efficiency, on the service life of the axial spring, on the reliability of the axial spring, and in particular it can induce a movement of the pad away from the decelerated disc, resulting in uneven wear of the brake pad.

Therefore, a need arises for new spring assemblies, pad assemblies, and brake caliper assemblies which can simultaneously offer, during the step of braking, in particular efficient performance in reducing, or even suppressing, any residual torque at the end of braking, as well as vibration and noise minimization properties and at the same time allow a high adaptability and ease of modification to be used in various fields of application and desired performance of disc brakes without affecting time and costs in the step of designing and manufacturing.

Therefore, the problem underlying the present invention is to devise a spring assembly, a pad assembly, and a brake caliper assembly, which have structural and functional features such to satisfy the aforementioned requirements and, at the same time, solve the drawbacks mentioned with reference to the prior art and satisfy the aforesaid felt needs.

Solution

It is an object of the present invention to provide a pad-holding spring and a pad return spring assembly, as well as a brake pad assembly, a floating disc brake assembly, which makes it possible to reduce if not eliminate residual torque once a braking action is completed.

These and other purposes and advantages are achieved with a pad-holding and pad return spring assembly, a brake pad assembly, and a floating disc brake assembly as described and claimed herein.

Some advantageous embodiments are also described.

The analysis of this solution showed that the suggested solution achieves a higher residual torque reduction between the brake pad and brake disc than the solutions of the prior art, thus a reduction in uneven brake pad wear events and in particular a reduction in maintenance events.

Furthermore, the suggested solution maintains a very high braking efficiency if not even improved, e.g., the efficiency is greatly improved by virtue of the absence of frictional contact between the pad return spring and the pad-holding spring.

Additionally, the suggested solutions make it possible to increase the service life of the pad-holding spring and pad return spring assembly compared to known solutions and to drastically reduce maintenance interventions.

Even further, by virtue of the proposed solutions, it is possible to guarantee simple spring assembly solutions according to the desired braking performance, maintaining a uniform pad-holding spring for various applications and modifying the pad return spring according to the applications. In particular, it is possible to supply different diameters of pad return springs according to the required applications in an extremely simple manner.

Even further, by virtue of the suggested solutions, it is possible to avoid modifying the layout of the disc brake assembly on which the pad return spring and pad-holding spring assembly is mounted.

Even further, by virtue of the suggested solutions, by preloading the pad return spring in the radial direction, it is possible to increase the stability of contact between the pad return spring and the brake pad, while avoiding sliding with friction between the pad return spring and the pad-holding spring on which the pad slides, and at the same time maximizing the axial force which pushes the pad away from the brake disc.

Even further, by virtue of the suggested solutions, by virtue of the portion of the pad-holding spring to which the pad return spring is connected, it is possible to guarantee, in conditions of advanced pad wear, an additional contribution to the axial force which moves the pad away from the brake disc.

FIGURES

Further features and advantages of the spring assembly, the pad assembly, and the disc brake assembly will be apparent from the following description of its preferred embodiments, given by way of non-limiting examples, with reference to the accompanying figures, in which:

DESCRIPTION OF SOME PREFERRED EMBODIMENTS

Figure 1:
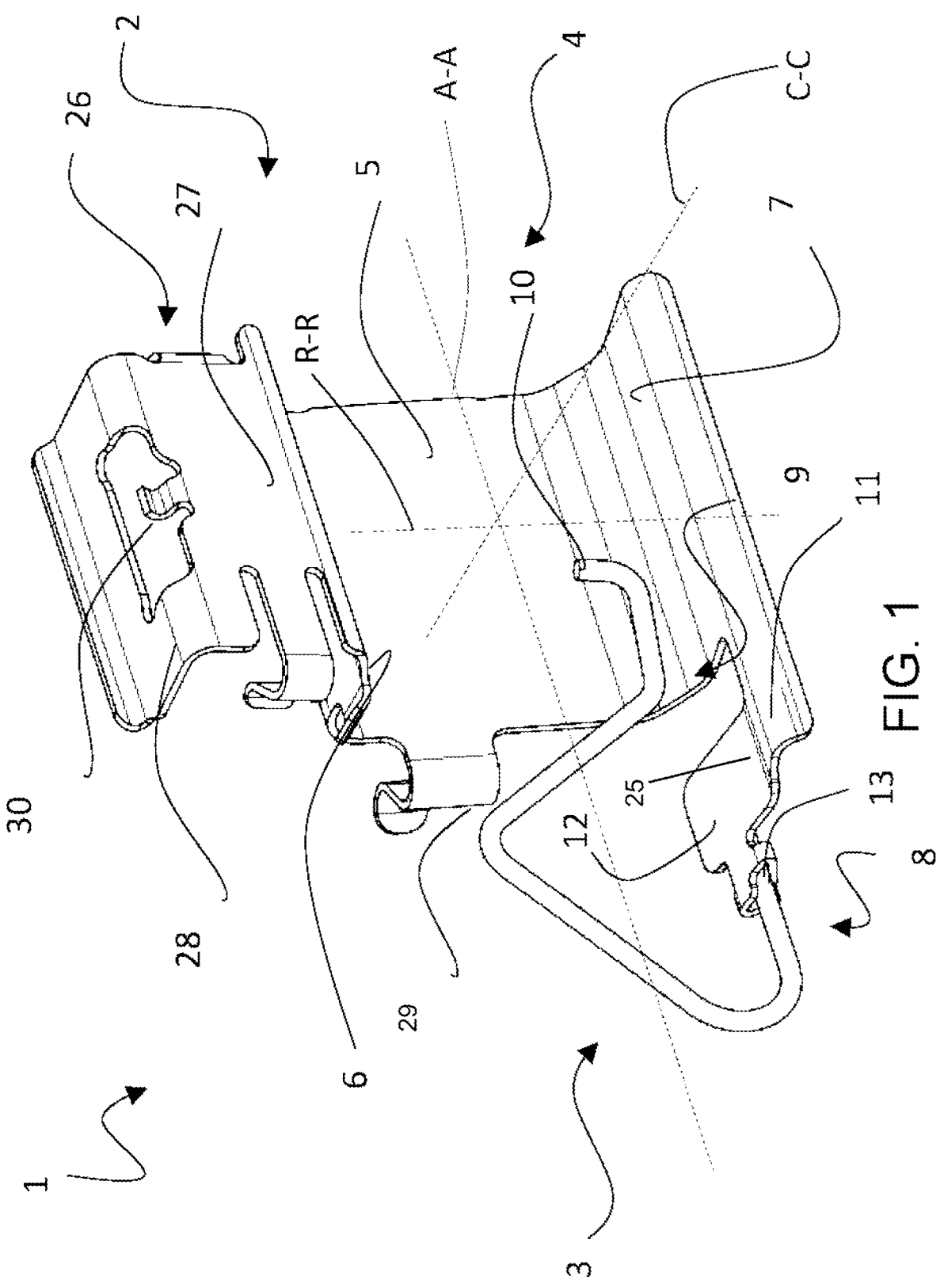
FIG. 1 is an axonometric view of a pad-holding spring and pad return spring assembly according to the present invention.
Figure 2:
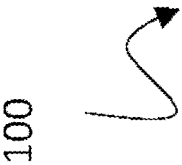
FIG. 2 shows in a partial section side view of a disc brake assembly according to the present invention comprising a support, at least one brake pad, a floating caliper, a brake disc, and an assembly in FIG. 1 connected to said support and said brake pad.
Figure 3:
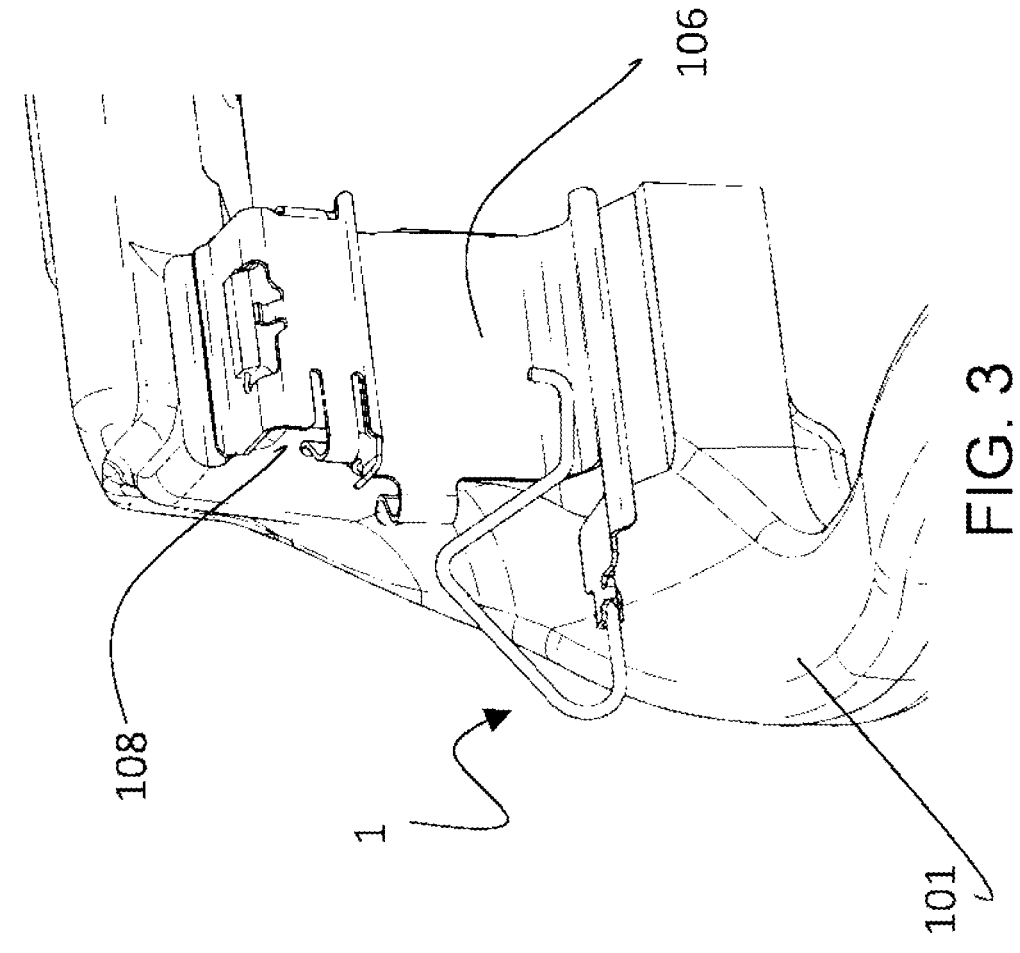
FIG. 3 is an axonometric view of the assembly of FIG. 1 comprising a pad-holding spring connected to the support of the disc brake assembly and a pad return spring.
Figure 4:
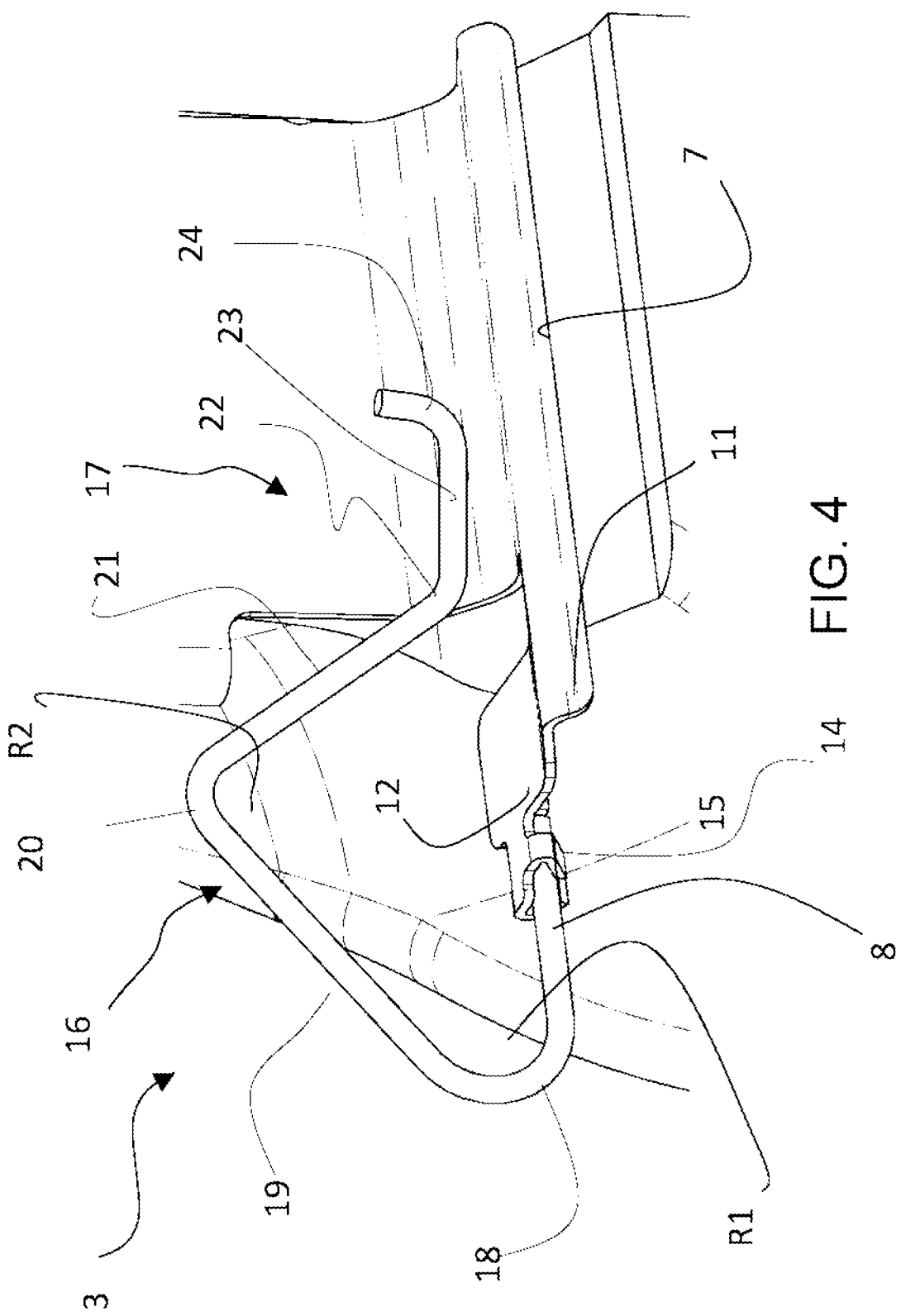
FIG. 4 shows an enlargement of the pad return spring in FIG. 3.
Figure 5:
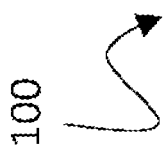
FIG. 5 shows an axonometric view of the assembly of FIG. 3, in which the pad-holding spring is interposed between the support of the disc brake assembly and a brake pad.
Figures 6, 7:
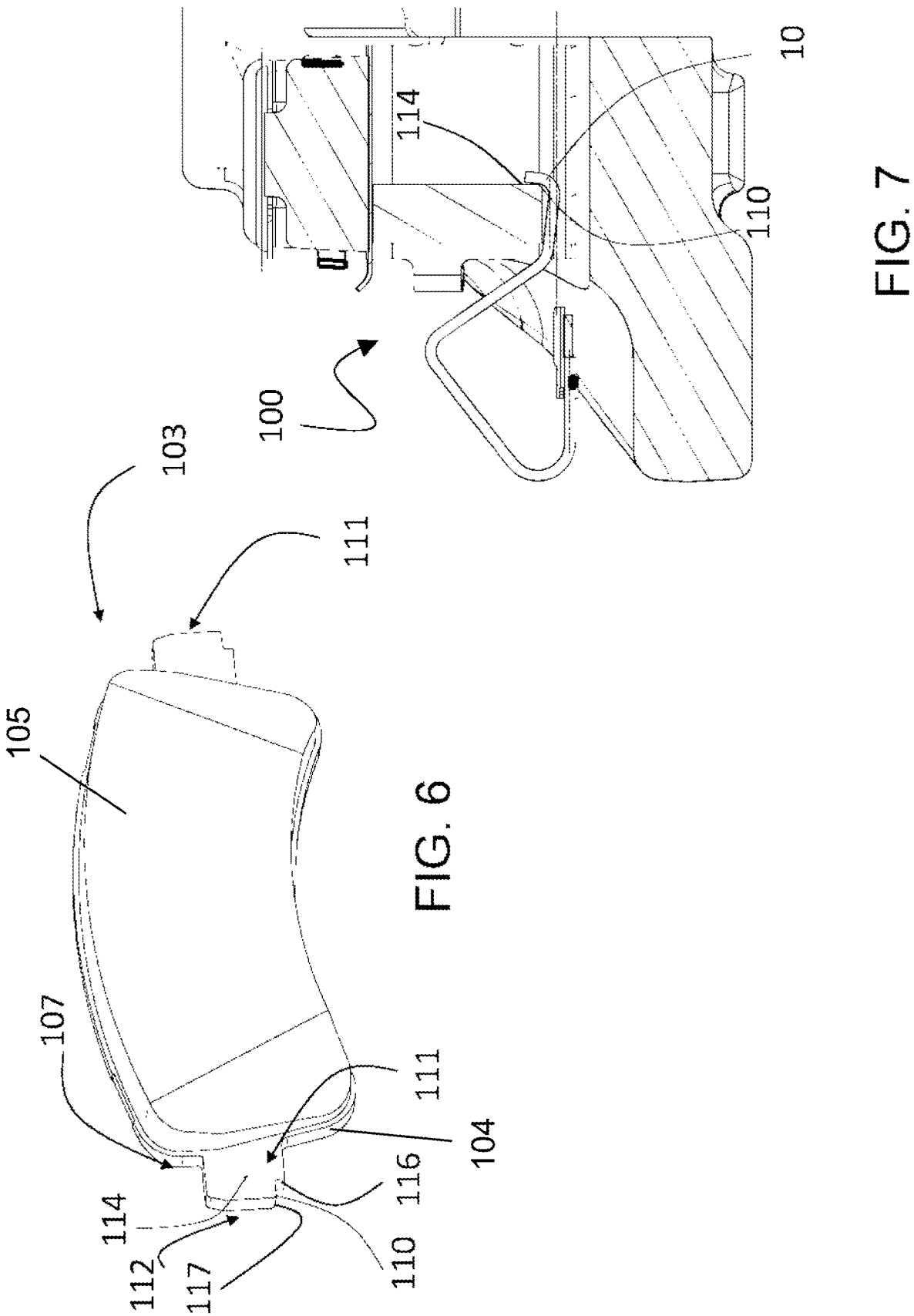
FIG. 6 shows an axonometric view of an embodiment of a brake pad connectable to an assembly according to the present invention.
FIG. 7 shows in a section view of a disc brake assembly according to the present invention in which the pad return spring is connected to the brake pad of FIG. 6.
Figures 8, 9:
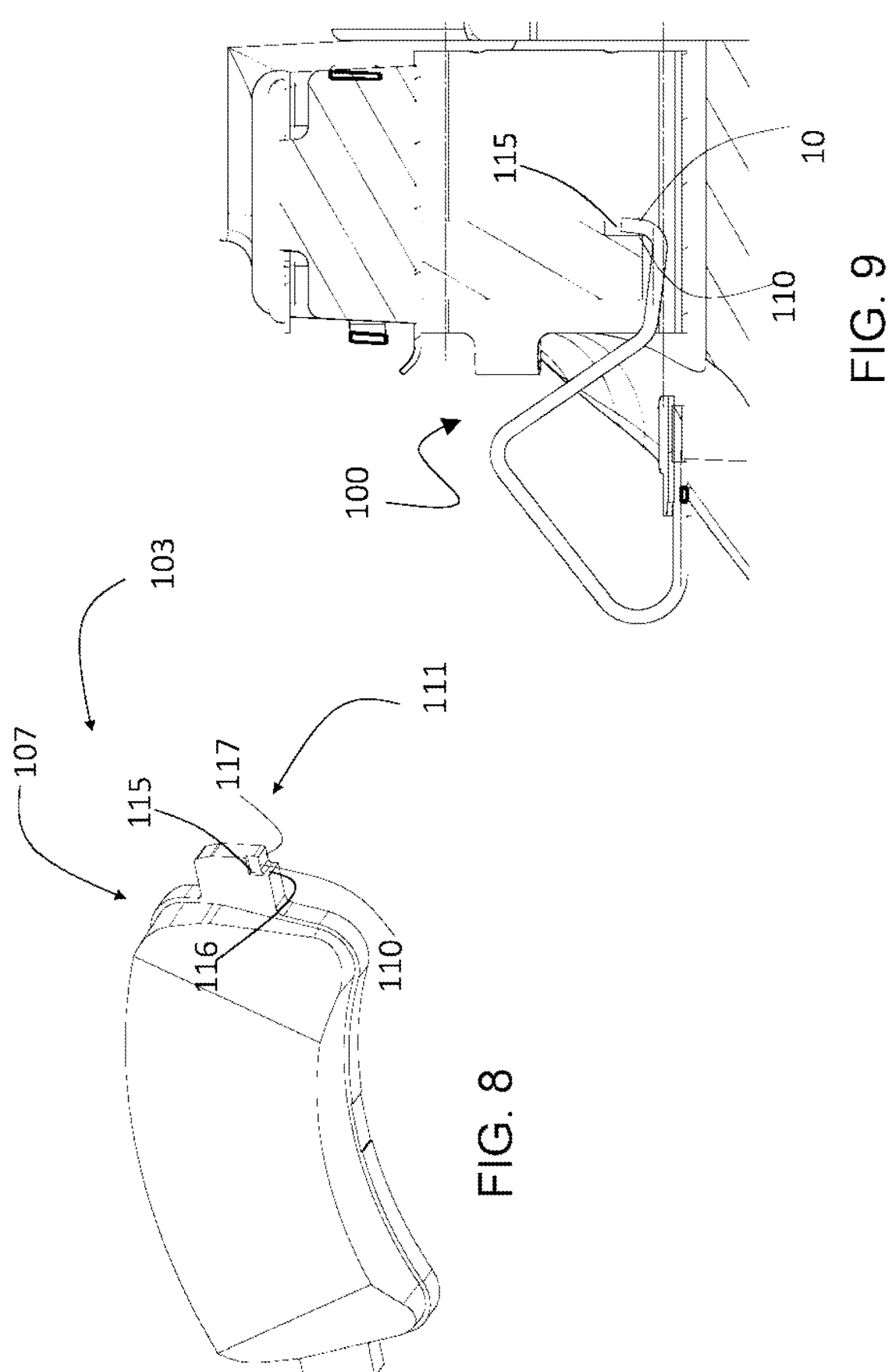
FIG. 8 shows an axonometric view of a further embodiment of a brake pad connectable to an assembly according to the present invention.
FIG. 9 shows a section view of a disc brake assembly according to the present invention in which the pad return spring is connected to the brake pad of FIG. 8.
Figure 10:
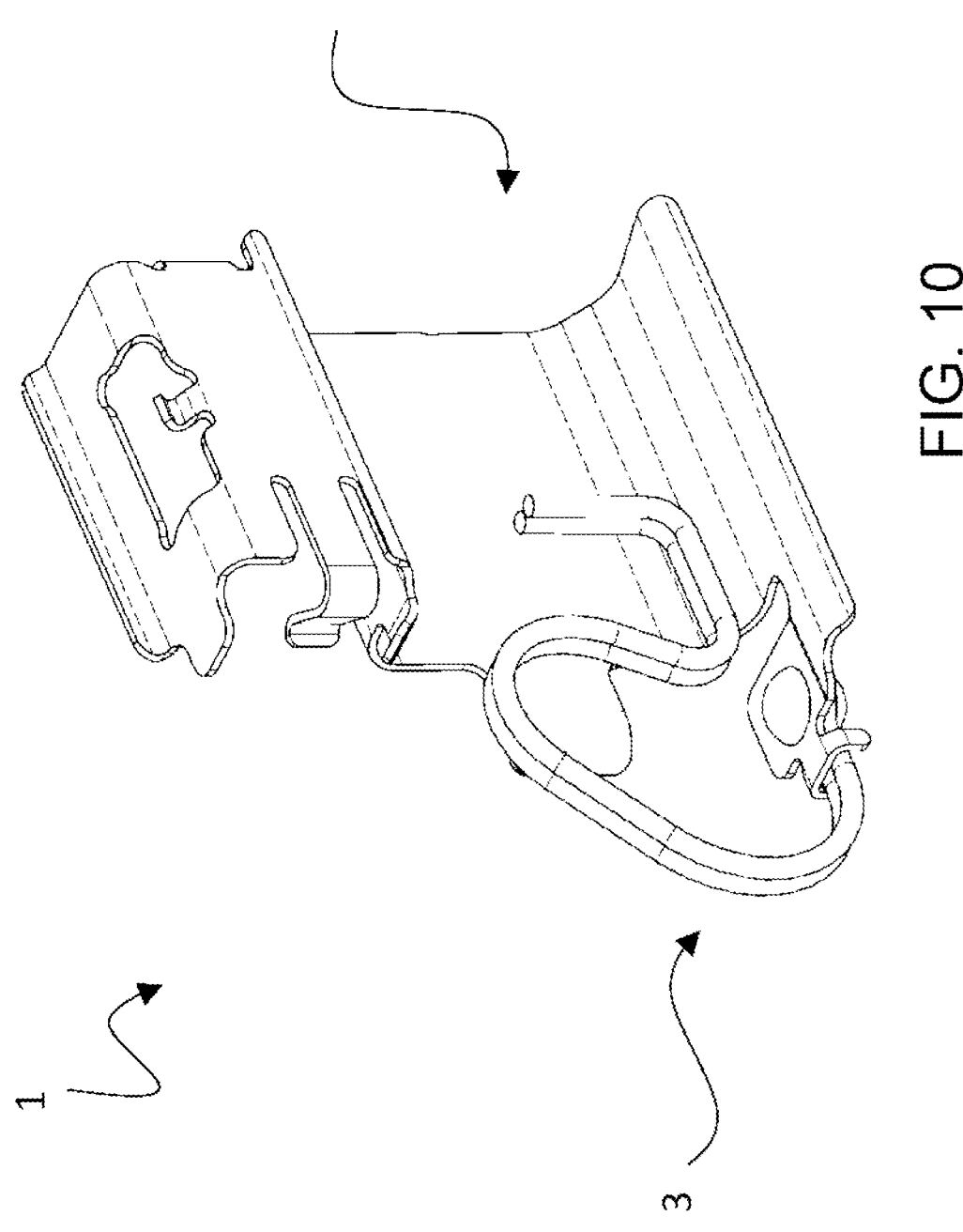
FIG. 10 shows an axonometric view of a further embodiment of a pad-holding spring and pad return spring assembly, according to the present invention.

According to a general embodiment, a pad-holding spring and pad return spring assembly 1 for a disc brake assembly 100 is provided.

Said assembly 1 defines an axial direction A-A, a radial direction R-R perpendicular to said axial direction A-A, and a circumferential or circumferential direction C-C perpendicular to both said axial direction A-A and said radial direction R-R.

According to an embodiment, said axial direction A-A is parallel to a rotational axis of brake disc 102 of a disc brake assembly 100.

Said assembly 1 comprises at least one pad-holding spring 2 and at least one pad-return spring 3, made of different semi-finished products and operatively connected afterward.

The pad-holding spring 2 is configured to be arranged between at least one guiding ear 111 of a brake pad 103 of the disc brake assembly 100 and a support 101 of the disc brake assembly 100 to bias said brake pad 103 in radial direction R-R and circumferential direction C-C.

The pad return spring 3 is configured to bias said brake pad 103 in the axial direction A-A away from a disc 102 of the disc brake assembly 100.

Said pad-holding spring 2 has a prevailing development in radial R-R and circumferential C-C.

Said pad-holding spring 2 comprises at least one C-shaped section 4. Said C-shaped section 4 comprises a central portion 5, an upper portion 6, and a lower portion 7. The central portion 5 extends substantially in the radial direction R-R. The upper portion 6 and the lower portion 7 extend substantially in the circumferential direction C-C extending from two opposite ends of the central portion 5.

Said C-shaped section 4 is adapted to be inserted into a recess 106 of said support 101 and is adapted to accommodate said guiding ear 111.

Said pad return spring 3 has a prevailing development in axial direction A-A and radial direction R-R and comprises an anchoring portion 8 and an elastic return arm 9.

Said anchoring portion 8 is operatively connected to said C-shaped section 4 which extends from said C-shaped section 4 in axial direction A-A with a first orientation opposite to said disc 102.

Said elastic return arm 9 is operatively connected to said anchoring portion 8 and has an elastic return arm terminal end 10.

Said elastic return arm 9 extends from said anchoring portion 8 along an elastic return arm longitudinal direction oriented in a prevalently axial direction A-A with a second orientation concordant with said disc 102, opposite to said first direction.

Said elastic return arm end 10 is configured to engage said brake pad 103.

Said elastic return arm 9 is elastically movable in an axial direction A-A between at least one advanced position towards said disc 102, protracted along said second direction, and a resting position retracted with opposite orientation.

The pad return spring 3 is made from at least one wire. Said wire is bent, i.e., said pad return spring 3 is shaped so that in each position of said elastic return arm 9, during normal operation, said elastic return arm 9 is spaced from any portion of said pad-holding spring 2 and from said anchoring portion 8 of said pad return spring 3.

Within this description, said first direction and said second direction mean two opposite axial directions A-A. For example, the C-shaped section is bounded axially by a first edge and a second edge, where the first edge is facing in the axial direction A-A in agreement with the first direction and said second edge vice versa. For the sake of ease of understanding, even when referring to the assembly 1 only, second direction means the direction toward a brake disc and first direction means the opposite direction.

According to an embodiment, in each position of said elastic return arm 9, during its normal operation, said elastic return arm 9 is spaced in the radial direction R-R from said lower portion 7 of said C-shaped section 4.

According to an embodiment, in each position of said elastic return arm 9, during its normal operation, said elastic return arm 9 is spaced in the circumferential direction C-C from said upper portion 6 of said C-shaped section 4.

Advantageously, by virtue of the provision of a guaranteed minimum distance between the elastic return arm 9 of the pad return spring 3 and any portion of the pad-holding spring 2 on which the brake pad 103 may slide in advancement and retraction, any contact between the pad return spring 3 and the pad-holding spring 2 can be avoided, and therefore, by avoiding the occurrence of sliding events with friction, it is possible to maximize the force along the axial direction A-A with which the pad return spring 3 biases the brake pad away from the brake disc 102.

With further advantage, the provision of a pad return spring made of wire, makes it possible to maximize the stiffness of the pad return spring, maximize the force exerted in the axial direction A-A, and at the same maximum force applied in the axial direction A-A it is possible to reduce the overall dimensions and weight of the assembly 1 compared to solutions in which the pad return spring is made of shaped and bent plate.

According to an embodiment, the central portion 5 extends along said radial direction R-R to affect said pad 103 in the circumferential direction C-C.

According to an embodiment, the upper portion 6 extends into in circumferential direction C-C, to bias said pad 103 in radial direction R-R.

According to an embodiment, the lower portion 7 extends in circumferential direction C-C to bias said pad 103 in radial direction R-R.

According to an embodiment, said pad return spring 3 is preloaded in a radial direction R-R so that in each position of said elastic return arm 9, during its normal operation, said elastic return arm 9 is free to slide in an axial direction A-A without interfering with each portion of said pad-holding spring 2 and with said anchoring portion 8

According to an embodiment, said elastic return arm end 10 has a contact wall which is configured to constantly come into contact with at least one pad edge 110 of a side edge of pad 107.

According to an embodiment, sad contact wall is facing in a radial direction R-R towards said upper portion 6 of said C-shaped section 4 of said pad-holding spring 2 and in an axial direction A-A in said first direction opposite to said disc 102.

According to an embodiment, said pad return spring 3 is preloaded in a radial direction R-R so that in each position of said elastic return arm 9, during its normal operation, said elastic return arm 9 is constantly in contact with said brake pad 103.

According to an embodiment, said elastic return arm end 10 is hook-shaped.

According to an embodiment, said pad-holding spring 2 comprises a first cantilevered portion 11 operatively connected to said lower portion 7. Said first cantilevered portion 11 extends cantilevered in axial direction A-A in said first direction, opposite to said brake disc 102.

According to a first embodiment, said pad-holding spring 2 comprises a second cantilevered portion 12 operatively connected to said first cantilevered portion 11, which extends in a circumferential direction C-C, wherein said anchoring portion 8 of said pad-holding spring 2 is fixed to said second cantilevered portion 12.

According to an embodiment, said second cantilevered portion 12 extends in a circumferential direction C-C towards said central portion 5 of said C-shaped section 4.

According to an embodiment, said second cantilevered portion 12 is elastically movable in a radial direction R-R between a resting position and at least one raised position in direction of said upper portion 6 of said pad-holding spring 2 so that when said elastic return arm 9 is biased in an axial direction A-A beyond a threshold limitation in the approaching direction to said brake disc 102, said second cantilevered portion 12 moves from said resting position in a radial direction R-R towards said upper portion 6 of said C-shaped section 4. In this manner, an additional axial direction A-A reaction force can be provided.

According to an embodiment, the first cantilevered portion 11 is substantially coplanar to said lower portion 7 of said C-shaped section 4, wherein said second cantilevered portion 12 is arranged at a lower position in the radial direction R-R than said lower portion 7 of said C-shaped section 4.

According to an embodiment, said first cantilevered portion 11 is connected to said second cantilevered portion 12 by an inclined portion in a radial and circumferential direction.

According to an embodiment, said first cantilevered portion 11 and said second cantilevered portion 12 form an L.

According to an embodiment, said second cantilevered portion 12 has an engagement wall 13 facing in a radial direction R-R on the opposite side from said upper portion of said C-shaped section 4.

According to an embodiment, said anchoring portion 8 of said pad return spring 3 is anchored to said engagement wall 13 of said pad-holding spring 2.

According to an embodiment, said anchoring portion 8 is arranged below said second cantilevered portion 12 in a radial direction, i.e., in a direction opposite to said upper portion 6.

According to an embodiment, said second cantilevered portion 12 comprises a coupling member 14 which extends in an axial direction A-A with said first orientation, opposite to said brake disc 102, wherein said coupling member 14 comprises a pair of coupling tabs 15 configured to clamp said anchoring portion 8 of said pad return spring 3.

According to an embodiment, said anchoring portion 8 of said pad return spring 3 is either riveted or welded to said second cantilevered portion 12.

Advantageously, in the phases of advanced wear of the brake pads, the deformation of said first cantilevered portion 11 and said second cantilevered portion 12 allows the increase in load in the axial direction A-A to be contained.

According to an embodiment, said pad-holding spring 2 comprises an L-shaped section 26 operatively connected to said C-shaped section 4 seamlessly and configured to engage said pad-holding spring to a support 101.

According to an embodiment, said L-shaped section 26 comprises a first support portion 27 operatively connected perpendicularly to a second support portion 28.

According to an embodiment, the first support portion 27 extends perpendicularly from said upper portion 6 of said C-shaped section 4 to make with said upper portion 6 and with said second support portion 28 a U-shaped section having concavity opposite to said C-shaped section 4.

According to an embodiment, the central portion 5 of said C-shaped section 4 comprises a first retaining element 29 which extends cantilevered in a circumferential direction C-C outside the concavity of said C-shaped section 4.

According to an embodiment, said L-shaped section 26 comprises an opening between said first support portion 27 and said second support portion 28 and said first support portion 27 comprises a second retaining element 30 which extends cantilevered in a circumferential direction C-C in said opening.

According to an embodiment, said first support portion 27 comprises a pair of retaining elements which protrude from opposite edges in a circumferential direction C-C within said L-shaped section 26.

According to an embodiment, said elastic return arm end longitudinal direction is S-shaped.

According to an embodiment, said pad return spring 3 has a convex portion 16 which develops from said anchoring portion 8 along said spring return arm longitudinal direction and a concave portion 17 operatively connected to said convex portion 16, wherein said concave portion 17 has concavity facing towards said upper portion 6 of said C-shaped section 4, and said convex portion 16 has a concavity facing the opposite side, facing at least partially towards said lower portion 7 of said C-shaped section 4.

According to an embodiment, said elastic return arm 9 comprises in succession, starting from said anchoring portion 8 along said elastic return arm longitudinal direction, a first curved section 18, a first rectilinear section 19, a second curved section a second rectilinear section 21, a third curved section 22, a third rectilinear section 23, a fourth curved section 24.

According to an embodiment, said pad return spring 3 extends along said longitudinal direction of elastic return arm in a single plane.

According to an embodiment, each portion of said return spring 3 extends in a plane orthogonal to said circumferential direction C-C.

According to an embodiment, said elastic return arm 9 is connected to said anchoring portion 8 with a first connecting radius R1, wherein the extensions of said elastic return arm 9 and said anchoring portion 8 form an angle of fewer than 90 degrees.

According to an embodiment, said elastic return arm 9 comprises a first rectilinear section 19 connected to a second rectilinear section 21 with a second connecting radius R2, wherein extensions of said first rectilinear section 19 and said second rectilinear section 21 form an angle of not less than 90 degrees.

According to an embodiment, wherein said elastic return arm 9 comprises a second rectilinear section 21 connected to a third rectilinear section 23 with a third connecting radius R3, wherein the extensions of said second rectilinear section 21 and said third rectilinear section 23 form an acute angle.

According to an embodiment, said pad return spring 3 is a circular cross-section spring.

Advantageously, according to the size of the diameter of the pad return spring 3, and on the first connection radius R1 defined in the design phase, it is possible to make pad return springs 3 adapted to specific fields of braking application which can be operatively connected to a previously described pad-holding spring of standard dimensions for different fields of braking application.

According to an embodiment, said assembly comprises two pad-holding springs 2 as previously described, two pad return springs 3 as previously described, and a bridge-like portion 25 which connects said pad-holding springs 2 to said pad return springs 3. Each pad-holding spring 2 and each pad return spring 3 work on a respective brake pad 103.

According to an embodiment, said spring return pad 3 is made with two parallel wires side by side in the circumferential direction C-C.

The present invention further relates to a brake pad assembly for a disc brake assembly 100 which comprises at least one pad-holding and pad return spring assembly 1 as previously described and at least one brake pad 103 to which said assembly 1 is connectible.

According to an embodiment, said brake pad 103 comprises friction material 105 and a support plate 104 which supports said friction material 105, wherein said support plate 104 comprises at least one guiding ear 111 protruding laterally in a circumferential direction C-C.

According to an embodiment, said C-shaped section 4 of said pad-holding spring 2 is configured to accommodate said guiding ear 111 to bias said pad 103 in a circumferential direction C-C and a radial direction R-R.

According to an embodiment, said elastic return arm terminal end 10 of said pad return spring 3 is configured to engage said guiding ear 111 to bias said pad 103 in a distancing direction away from a brake disc 102.

According to an embodiment, said brake pad 103 comprises a first ear side edge 112 which laterally delimits said guiding ear 111 in circumferential direction C-C and radial direction R-R, wherein said ear side edge 112 comprises a pad edge 110.

According to an embodiment, when said assembly 1 is connected to said brake pad 103, said pad edge 110 faces said lower portion 7 of said C-shaped section 4 of said pad-holding spring 2 in radial direction R-R and faces said brake disc 102 in the axial direction A-A.

According to an embodiment, said side ear edge 112 can is insertable in said C-shaped section 4.

According to an embodiment, said ear side edge 112 comprises a circumferential edge portion 117 which extends in a circumferential direction C-C and a radial edge portion 116 which extends in a radial direction R-R.

According to an embodiment, said radial edge portion 116 faces said central portion 5 of said C-shaped section 4.

According to an embodiment, said circumferential edge portion 117 even comprises said pad edge 110.

According to an embodiment, said elastic return arm 9 is engaged, or engageable, with said pad edge 110, and movements in the circumferential direction of said elastic return arm 9 are limited by the presence of said radial edge portion 116.

According to an embodiment, said elastic return arm terminal end 10 is engageable at least to said pad edge 110 to bias said pad 103 in axial direction A-A constantly with the orientation opposite to said friction material 105.

According to an embodiment, said guiding ear 111 comprises a guiding ear rear surface 113 which faces the opposite side of said friction material 105 and a first ear front surface 114 which faces the same side of said friction material 105, said first ear front surface 114 comprises a first ear recess 115, and said first ear recess 115 comprises said pad edge 110.

According to an embodiment, said elastic return arm end 10 can be completely housed in said first ear recess 115 at least when said friction material 105 is completely worn so that said elastic return arm 9 does not interfere with said brake disc 102.

The present invention also relates to a disc brake assembly 100 comprising at least one pad assembly as described above.

Said disc brake assembly 100 comprises a support 101 which can be connected in a fixed manner to a vehicle facing a rotating brake disc, wherein said support comprises at least one brake pad housing pocket, wherein said housing pocket comprises at least one recess 106.

Said pad-holding spring is interposed at least between said guide ear 111 and said recess 106.

The disc brake assembly 100 comprises a brake caliper 109 connected in a floating manner to said support, said brake caliper being configured to be arranged straddling said brake disc 102 and to bias said brake pad 103 along said axial direction A-A approaching said brake disc 102 between at least one pad resting position and a pad braking position.

Said elastic return arm terminal end 10 of said pad return spring 3 is engaged with said guiding ear 111 to bias it in the distancing direction away from said brake disc 102.

The pad return spring 3 is shaped so that, in each position of said brake pad 103, said elastic return arm 9 is spaced from each portion of said pad-holding spring 2 and said anchoring portion 8 of said pad return spring 3.

According to an embodiment, said disc brake assembly 100 comprises a brake disc 102, wherein said floating caliper is arranged straddling said disc 102, wherein said brake disc (102) comprises a disc axis, wherein said axial direction A-A is parallel to said disc axis.

According to an embodiment, said support 101 comprises a support protuberance 108, wherein said L-shaped section 26 is engaged with said protuberance 108.

LIST OF REFERENCES

1 Pad-holding and pad return spring assembly
2 pad-holding spring
3 pad return spring
4 C-shaped section
5 central portion
6 upper portion
7 lower portion
8 anchoring portion
9 elastic return arm
10 elastic return arm end
11 first cantilevered portion
12 second cantilevered portion
13 engagement wall
14 coupling member
15 coupling tabs
16 convex portion
17 concave portion
18 first curved stretch
19 first rectilinear stretch
20 second curved stretch
21 second rectilinear stretch
22 third curved stretch
23 third rectilinear stretch
24 fourth curved stretch
25 bridge-like portion
26 L-shaped section
27 first supporting portion
28 second supporting section
29 first retaining element
30 second retaining element
100 disc brake assembly
101 support
102 brake disc
103 brake pad
104 backing plate
105 friction material
106 recess
107 brake pad side edge
108 support protuberance
109 brake caliper
110 pad edge
111 guiding ear
112 ear side edge
113 ear rear surface
114 ear front surface
115 ear recess
116 radial edge portion
117 circumferential edge portion
R1 first connection radius
R2 second connection radius
A-A axial direction
R-R radial direction
C-C circumferential or tangential direction
The invention claimed is:

1. A pad-holding and pad return spring assembly for a disc brake assembly, wherein said pad-holding and pad return spring assembly defines an axial direction, a radial direction perpendicular to said axial direction and a circumferential or tangential direction perpendicular to both said axial direction and said radial direction), said pad-holding and pad return spring assembly comprising:

at least one pad-holding spring configured to be arranged between at least one guiding ear of a brake pad of the disc brake assembly and a support of the disc brake assembly to bias said brake pad in the radial and circumferential directions, and a pad return spring configured to bias said brake pad in the axial direction away from a brake disc of the disc brake assembly, wherein said pad-holding spring and said pad return spring are made as separate pieces and are operatively connected, wherein said pad-holding spring has a prevailing development in the radial and circumferential directions and comprises at least:

a C-shaped section comprising a central portion that develops substantially in the radial direction, an upper portion and a lower portion extending from radially opposite ends of the central portion and developing substantially in the circumferential direction, wherein said C-shaped section is adapted to be inserted in a recess of said support and to accommodate said guiding ear, wherein said pad return spring has a prevalent development in the axial and radial directions and comprises:

an anchoring portion operatively connected to said C-shaped section and extending from said C-shaped section in the axial direction with a first orientation opposite to said brake disc, and an elastic return arm operatively connected to said anchoring portion and having an elastic return arm end configured to engage said brake pad, wherein said elastic return arm develops from said anchoring portion along an elastic return arm longitudinal direction prevalently oriented in the axial direction with a second orientation concordant with said brake disc, opposite to said first orientation, wherein said elastic return arm is elastically movable in the axial direction between at least one advanced position towards said brake disc and a resting position retracted with opposite orientation, and wherein said pad return spring is made of at least one wire, wherein said at least one wire is bent so that, in each position of said elastic return arm, during normal operation, said elastic return arm is spaced from any portion of said pad-holding spring and from said anchoring portion of said pad return spring.

2. The pad-holding and pad return spring assembly of claim 1, wherein said pad return spring is preloaded in the radial direction so that in each position of said elastic return arm, during its normal operation, said elastic return arm is free to slide in the axial direction without interfering with each portion of said pad-holding spring and with said anchoring portion.

3. The pad-holding and pad return spring assembly of claim 1, wherein said elastic return arm end has a contact wall configured to be in constant contact with at least one pad edge of a pad side edge, wherein said contact wall is facing in the radial direction towards said upper portion of said C-shaped section of said pad-holding spring and in the axial direction with said first orientation opposite to said brake disc, and/or wherein said elastic return arm end is hook-shaped.

4. The pad-holding and pad return spring assembly of claim 1, wherein said pad-holding spring comprises a first cantilevered portion operatively connected to said lower portion extending cantilevered in the axial direction with said first orientation, opposite to said brake disc, wherein said pad-holding spring comprises a second cantilevered portion operatively connected to said first cantilevered portion extending in the circumferential direction, and wherein said anchoring portion of said pad return spring is fixed to said second cantilevered portion.

5. The pad-holding and pad return spring assembly of claim 4, wherein said second cantilevered portion is elastically movable in the radial direction between a resting position and at least one raised position in direction of said upper portion of said pad-holding spring, so that when said elastic return arm is biased in the axial direction beyond a threshold limitation in an approaching direction of said brake disc, said second cantilevered portion moves from said resting position in the radial direction towards said upper portion of said C-shaped section.

6. The pad-holding and pad return spring assembly of claim 4, wherein said first cantilevered portion is substantially coplanar to said lower portion of said C-shaped section, wherein said second cantilevered portion is arranged in a lower position in the radial direction with respect to said lower portion of said C-shaped section, and/or wherein said first cantilevered portion is connected to said second cantilevered portion by an inclined portion in a radial, circumferential direction.

7. The pad-holding and pad return spring assembly of claim 4, wherein said second cantilevered portion comprises an engagement wall facing in the radial direction from an opposite side relative to said upper portion of said C-shaped section, wherein said anchoring portion of said pad return spring is anchored to said engagement wall of said pad-holding spring, and/or wherein said second cantilevered portion comprises a coupling member extending in the axial direction with said first orientation opposite to said brake disc, wherein said coupling member comprises a pair of coupling tabs configured to clamp said anchoring portion of said pad return spring, and/or wherein said anchoring portion of said pad return spring is either riveted or welded to said second cantilevered portion.

8. The pad-holding and pad return spring assembly of claim 1, wherein said elastic return arm longitudinal direction has an S-shaped conformation.

9. The pad-holding and pad return spring assembly of claim 1, wherein said pad return spring comprises a convex portion that develops from said anchoring portion along said spring return arm longitudinal direction and a concave portion operatively connected to said convex portion, wherein said concave portion has concavity facing towards said upper portion of said C-shaped section, and said convex portion has a concavity facing an opposite side, facing at least partially towards said lower portion of said C-shaped section.

10. The pad-holding and pad return spring assembly of claim 1, wherein said elastic return arm comprises in succession, starting from said anchoring portion along said elastic return arm longitudinal direction, a first curved section, a first rectilinear section, a second curved section, a second rectilinear section, a third curved section, a third rectilinear section, and a fourth curved section.

11. The pad-holding and pad return spring assembly of claim 1, said pad return spring develops along said elastic return arm longitudinal direction on a single plane, and/or wherein each portion of said pad return spring develops on a plane orthogonal to said circumferential direction.

12. The pad-holding and pad return spring assembly of claim 1, wherein said elastic return arm is connected to said anchoring portion with a first connecting radius, wherein extensions of said elastic return arm and said anchoring portion form an angle of less than 90 degrees.

13. The pad-holding and pad return spring assembly of claim 1, wherein said elastic return arm comprises a first rectilinear section connected to a second rectilinear section with a second connecting radius, wherein extensions of said first rectilinear section and said second rectilinear section form an angle of not less than 90 degrees.

14. The pad-holding and pad return spring assembly of claim 1, wherein said elastic return arm comprises a second rectilinear section connected to a third rectilinear section with a third connecting radius, wherein extensions of said second rectilinear section and said third rectilinear section form an acute angle.

15. The pad-holding and pad return spring assembly of claim 1, comprising two pad-holding springs, two pad-return springs and a bridge portion that connects said two pad-holding springs, and wherein pad-holding and pad return spring assembly comprises at least one of the following features:

said pad-return spring is made with two parallel wires side by side, said pad-holding spring comprises an L-shaped section operatively connected to said C-shaped section without interruption, wherein said L-shaped section comprises a first support portion operatively connected perpendicularly to a second support portion, wherein said first support portion extends perpendicularly from said upper portion of said C-section to make with said upper portion and with said second support portion a U-shaped section having a concavity opposite to said C-shaped section, said central portion of said C-shaped section comprises a first retaining element that extends cantilevered in the circumferential direction outside a concavity of said C-shaped section, said L-shaped section comprises an opening between said first support portion and said second support portion, and said first support portion comprises a second retaining member that extends cantilevered in the circumferential direction in said opening, said first support portion comprises a pair of retaining elements projecting from opposite edges in the circumferential direction within said L-shaped section.

16. A brake pad assembly for a disc brake assembly, comprising:

at least one brake pad, and at least one pad-holding and pad return spring assembly defining an axial direction, a radial direction perpendicular to said axial direction and a circumferential or tangential direction perpendicular to both said axial direction and said radial direction, said pad-holding and pad return spring assembly comprising:

at least one pad-holding spring configured to be arranged between at least one guiding ear of a brake pad of the disc brake assembly and a support of the disc brake assembly to bias said brake pad in the radial and circumferential directions, and a pad return spring configured to bias said brake pad in the axial direction away from a brake disc of the disc brake assembly, wherein said pad-holding spring and said pad return spring are made as separate pieces and are operatively connected, wherein said pad-holding spring has a prevailing development in the radial and circumferential directions and comprises at least:

a C-shaped section comprising a central portion that develops substantially in the radial direction, an upper portion and a lower portion extending from radially opposite ends of the central portion and developing substantially in the circumferential direction, wherein said C-shaped section is adapted to be inserted in a recess of said support and to accommodate said guiding ear, wherein said pad return spring has a prevalent development in the axial and radial directions and comprises:

an anchoring portion operatively connected to said C-shaped section and extending from said C-shaped section in the axial direction with a first orientation opposite to said brake disc, and an elastic return arm operatively connected to said anchoring portion and having an elastic return arm end configured to engage said brake pad, wherein said elastic return arm develops from said anchoring portion along an elastic return arm longitudinal direction prevalently oriented in the axial direction with a second orientation concordant with said brake disc, opposite to said first orientation, wherein said elastic return arm is elastically movable in the axial direction between at least one advanced position towards said brake disc and a resting position retracted with opposite orientation, and wherein said pad return spring is made of at least one wire, wherein said at least one wire is bent so that, in each position of said elastic return arm, during normal operation, said elastic return arm is spaced from any portion of said pad-holding spring and from said anchoring portion of said pad return spring, wherein said pad-holding and pad return spring assembly is connectable to said brake pad, wherein said brake pad comprises friction material and a support plate supporting said friction material, wherein said support plate comprises the at least one guiding ear protruding laterally in the circumferential direction, wherein said C-shaped section of said pad-holding spring is configured to accommodate said guiding ear to bias said brake pad in the circumferential direction and the radial direction, and wherein said elastic return arm end of said pad return spring is configured to engage said guiding ear to bias said brake pad in a distancing direction away from the brake disc.

17. The brake pad assembly of claim 16, wherein said brake pad comprises a first ear side edge that laterally delimits said guiding ear in the circumferential direction and in the radial direction, wherein said ear side edge comprises a pad edge, wherein, when said pad-holding and pad return spring assembly is connected to said brake pad, said pad edge faces in the radial direction said lower portion of said C-shaped section of said pad-holding spring and, in the axial direction, faces said brake disc, wherein said ear side edge is insertable in said C-shaped section, and wherein said elastic return arm end is engageable at least to said pad edge to bias said brake pad in the axial direction constantly with orientation opposite to said friction material.

18. The brake pad assembly of claim 17, wherein said guiding ear comprises a guiding ear rear surface that faces an opposite side of said friction material and a first ear front surface that faces the same side of said friction material, wherein said first ear front surface comprises a first ear recess, wherein said first ear recess comprises said pad edge, wherein said elastic return arm end is completely accommodated in said first ear recess at least when said friction material is completely worn so that said elastic return arm does not interfere with said brake disc, and/or wherein said ear side edge comprises a circumferential edge portion that develops in the circumferential direction and a radial edge portion that develops in the radial direction, wherein said circumferential edge portion comprises said pad edge, and wherein said radial edge portion restricts movements of said elastic return arm in the circumferential direction.

19. The disc brake assembly of claim 16 comprising:

the support facing the rotating brake disc, wherein said support comprises at least one brake pad housing pocket, wherein said brake pad housing pocket comprises the at least one recess, the brake pad assembly, wherein said pad-holding spring is interposed at least between said guiding ear and said recess, a brake caliper connected in floating manner to said support, said brake caliper being configured to be arranged straddling said brake disc and to bias said brake pad along said axial direction approaching said brake disc between at least one pad resting position and a pad braking position, wherein said elastic return arm end of said pad return spring is engaged with said guiding ear to bias the guiding ear in a distancing direction away from said brake disc, and wherein said pad return spring is shaped so that, in each position of said brake pad, said elastic return arm is spaced from each portion of said pad-holding spring and from said anchoring portion of said pad return spring.

20. The disc brake assembly of claim 19, comprising the brake disc, wherein the brake caliper connected in a floating manner is arranged straddling said brake disc, wherein said brake disc comprises a disc axis, wherein said axial direction is parallel to said disc axis, and/or wherein said support comprises a support protuberance, wherein said L-shaped section is engaged with said support protuberance.

* * * * *